(12) United States Patent
Yoshida

(10) Patent No.: US 7,722,270 B2
(45) Date of Patent: May 25, 2010

(54) PRINTING SYSTEM, INFORMATION PROCESSING APPARATUS, PRINTING APPARATUS, AND PRINTING METHOD

(75) Inventor: Masayuki Yoshida, Yokohama (JP)

(73) Assignee: Canon Kabushiki Kaisha (JP)

( * ) Notice: Subject to any disclaimer, the term of this patent is extended or adjusted under 35 U.S.C. 154(b) by 1090 days.

(21) Appl. No.: 11/396,152

(22) Filed: Mar. 31, 2006

(65) Prior Publication Data
US 2006/0221360 A1    Oct. 5, 2006

(30) Foreign Application Priority Data
Mar. 31, 2005    (JP)    ............... 2005-103822

(51) Int. Cl.
*B41J 13/24*    (2006.01)
(52) U.S. Cl. ............... 400/620; 400/582; 399/8; 399/10; 399/19; 399/20; 399/85
(58) Field of Classification Search ............... 399/19, 399/10, 83, 45, 8, 18, 20, 21, 80, 81, 85; 400/620, 582, 578
See application file for complete search history.

(56) References Cited
U.S. PATENT DOCUMENTS
7,016,083 B2 *    3/2006    Kotaka ............... 358/296
2001/0007619 A1 *    7/2001    Kakutani ............... 400/582
2004/0184107 A1    9/2004    Iino et al.
2005/0111015 A1 *    5/2005    Tsujimoto ............... 358/1.9

FOREIGN PATENT DOCUMENTS
JP    2002-169674 A    6/2002
JP    2004-188618 A    7/2004
JP    2004-213251 A    7/2004
JP    2004-287662 A    10/2004

* cited by examiner

Primary Examiner—Ren Yan
Assistant Examiner—Matthew G Marini
(74) Attorney, Agent, or Firm—Rossi, Kimms & McDowell LLP

(57) ABSTRACT

A method in an information processing apparatus which communicates with a printing apparatus which stores print data and print setting information is disclosed. This method includes: an obtaining step of obtaining the print setting information from the printing apparatus; a discriminating step of, if the print setting information obtained in the obtaining step is edited, discriminating whether or not it is necessary to recreate the print data for the printing based on the edited print setting information; and a transmitting step of, if it is determined in the discriminating step that it is unnecessary to recreate the print data, transmitting the edited print setting information to the printing apparatus in order to allow the printing apparatus to print the print data stored in the printing apparatus.

7 Claims, 20 Drawing Sheets

```
PAGE SETTING
ORIGINAL SIZE: A4
SHEET SIZE: 210.0 mm × 297.0 mm, 8.27 in × 11.69 in
OUTPUT SHEET SIZE: THE SAME AS ORIGINAL SIZE
SHEET SIZE: 210.0 mm × 297.0 mm, 8.27 in × 11.69 in
THE NUMBER OF COPIES: 1 COPY
ORIENTATION OF PRINTING: PORTRAIT
PAGE LAYOUT: 1 PAGE/SHEET (DEFAULT)
DESIGNATION OF MAGNIFICATION: NONE     100%
STAMP: NONE
―――――――――――――――――――――――――――――
PAGE FRAME: NO FRAME
PRINTING OF DATE: NONE
PRINTING OF USER NAME: NONE
PRINTING OF PAGE NUMBER: NONE
―――――――――――――――――――――――――――――
PROCESSING METHOD: NOT EXECUTE OVERLAY PRINTING
=============================
FINISH
PRINTING METHOD: SIMPLEX PRINTING
COMBINE SHEETS OF DIFFERENT SIZES/ORIENTATIONS: NONE
BINDING DIRECTION: BIND AT MAJOR SIDE (LEFT)
BINDING MARGIN: 0 mm
PAPER EJECTING METHOD: NOT DESIGNATED
―――――――――――――――――――――――――――――
```

PRINTING SYSTEM, INFORMATION PROCESSING APPARATUS, PRINTING APPARATUS, AND PRINTING METHOD

BACKGROUND OF THE INVENTION

1. Field of the Invention

The invention relates to a print system in which a printing apparatus executes printing in accordance with a print instruction from an information processing apparatus and also relates to the information processing apparatus, the printing apparatus, and a printing method.

2. Related Background Art

Hitherto, as such a kind of print system, there has been known a print system in which print data is stored into a box as a specific memory in a printer until a print instruction is issued from a host side (refer to Japanese Patent Application Laid-open No. 2002-169674). In such a print system, the box is associated with print setting and when a document (print data) is inputted into the box, the print setting is automatically applied to printing upon executing the printing. The print data is stored into the box together with the print setting. Further, when the print setting is automatically applied, which one of the print setting associated with the box and print setting annexed to the print data is preferentially used can be previously set.

In the conventional print system, however, since the print data stored in the box on the printer side is not associated as application data on the host computer side, there are the following problems.

That is, as for the same document (print data), when the user does not recognize the fact that the document has already been stored in the box, in spite of the fact that the print data exists in the box, it is necessary to form the print data again, transmit the formed print data, and allow the printer to execute the printing.

In this case, since a printing process is executed from the beginning, performance is delayed. Further, since the same print data is stored as another file into the box, data management is not efficient.

Since the print data is formed again irrespective of whether or not print setting information stored in the printing apparatus has been edited, there is a problem that the performance is low.

SUMMARY OF THE INVENTION

It is the first object of the invention to provide a mechanism in which print data stored in a printing apparatus is efficiently used and printing can be executed at a high speed.

It is the second object of the invention to improve printing performance in the case where print setting information set in print data stored in a printing apparatus has been edited.

According to the invention, there is disclosed a method in an information processing apparatus which communicates with a printing apparatus which stores print data and print setting information. This method includes:

an obtaining step of obtaining the print setting information from the printing apparatus;

a discriminating step of, if the print setting information obtained in the obtaining step is edited, discriminating whether or not it is necessary to recreate the print data for the printing based on the edited print setting information; and a transmitting step of, if it is determined in the discriminating step that the it is unnecessary to recreate the print data, transmitting the edited print setting information to the printing apparatus in order to allow the printing apparatus to print the print data stored in the printing apparatus.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 9 is a diagram showing contents of the job ticket 610;

DETAILED DESCRIPTION OF THE PREFERRED EMBODIMENTS

Embodiments of a print system, an information processing apparatus, a printing apparatus, and a printing method of the invention will now be described with reference to the drawings. The print system of the embodiments is applied to a document print system.

First Embodiment

Figure 1:
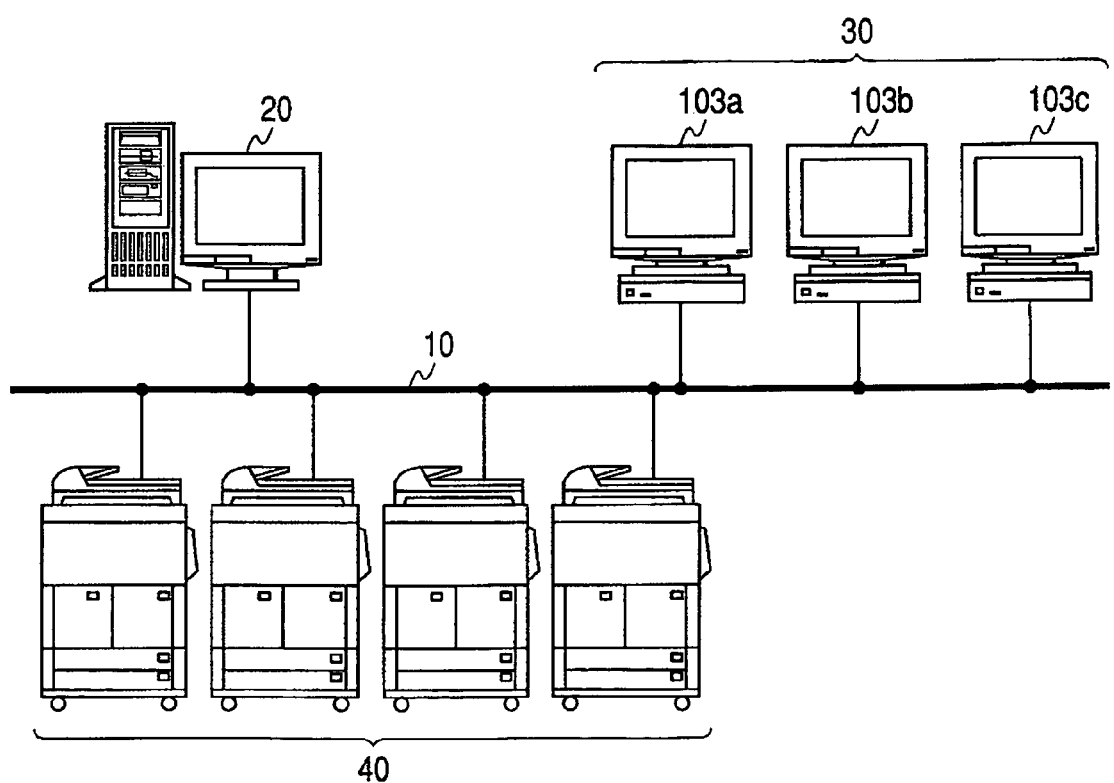
FIG. 1 is a diagram showing a construction of a document print system in the first embodiment.

FIG. 1 is a diagram showing a construction of the document print system in the first embodiment. The document print system has a construction in which a document server (file server) 20, a plurality of client computers 30, and a plurality of printers 40 are connected through a network 10. As will be explained hereinafter, each of the document server 20 and the client computers 30 is constructed by a general computer. In the embodiment, each of the printers 40 is constructed by a multifunction printer (MFP) having a printer function, a scanner function, and a copying function.

Figure 2:
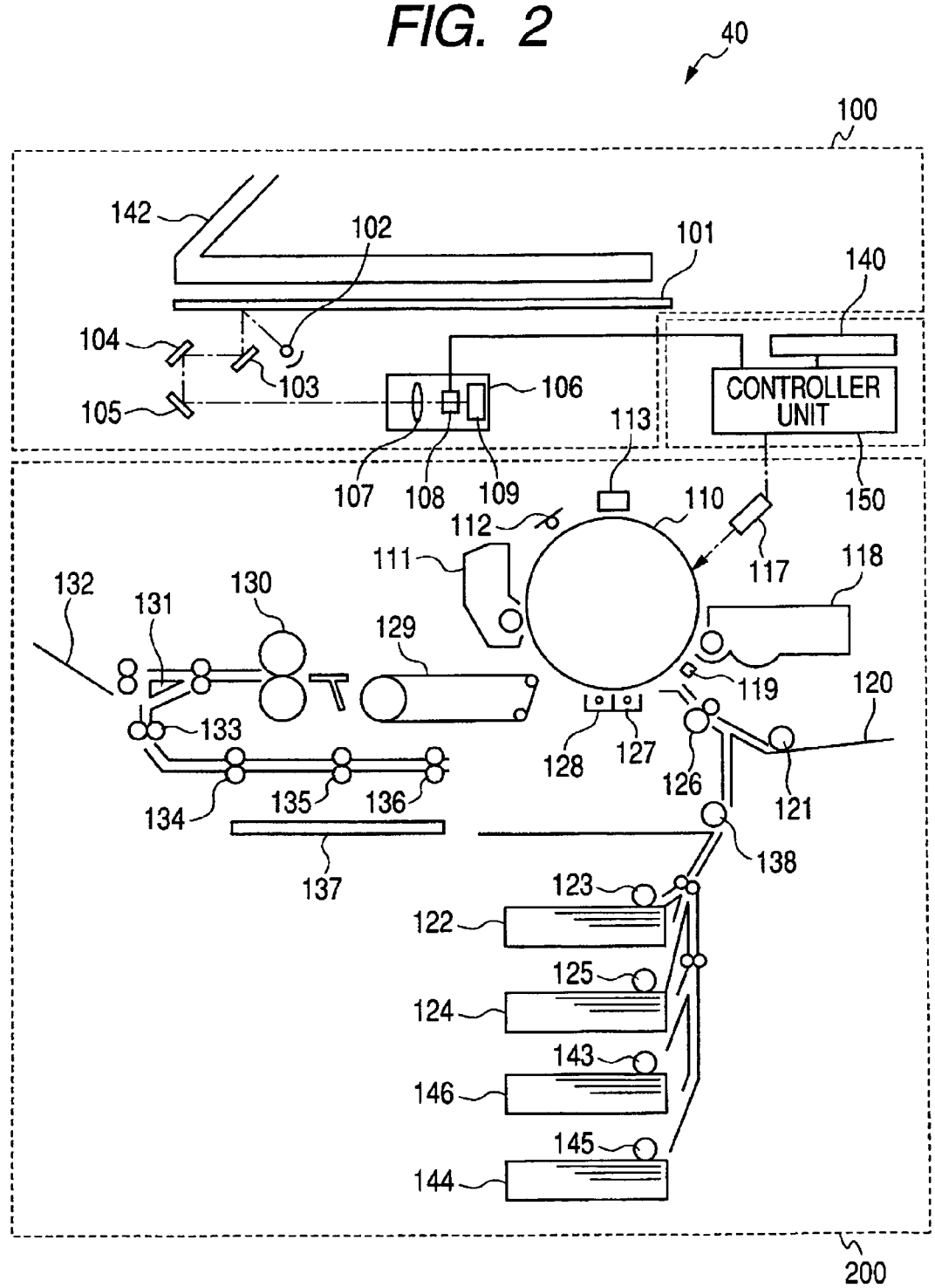
FIG. 2 is a diagram showing an internal construction of a printer 40.

FIG. 2 is a diagram showing an internal construction of the printer 40. The printer 40 is constructed by a scanner unit 100 and a printer unit 200. On the scanner unit 100 side, originals fed by an automatic document feeder (ADF) 142 are sequentially put to a predetermined position on a copyboard glass 101. An original illuminating lamp 102 is constructed by, for example, a halogen lamp and exposes the original put on the copyboard glass 101. Scanning mirrors 103, 104, and 105 are enclosed in an optical scanning unit (not shown) and guide reflection light from the original to a CCD unit 106 while reciprocatively moving. The CCD unit 106 is constructed by: an image forming lens 107 for forming an image of the reflection light from the original onto an image pickup device 108; the image pickup device 108 such as a CCD; a CCD driver 109 for driving the image pickup device 108; and the like. An image signal which is outputted from the image pickup device 108 is converted into digital data of, for example, 8 bits and subsequently inputted to a controller unit 150.

On the printer unit 200 side, charges on a photosensitive drum 110 are removed by a pre-exposing lamp 112 in order to prepare for image creation. The photosensitive drum 110 is uniformly charged by a primary charging unit 113. A semiconductor laser 117 serving as exposing means exposes the photosensitive drum 110 on the basis of image data processed by the controller unit 150, thereby forming an electrostatic latent image. A developing unit 118 encloses a black developing material (toner). A pre-transfer charging unit 119 applies a high voltage prior to transferring the toner image developed on the photosensitive drum 110. In a manual paper feeding unit 120 and paper feeding units 122, 124, 146, and 144, a transfer sheet is fed into the apparatus by the driving of each of paper feeding rollers 121, 123, 125, 143, and 145. After the sheet is once stopped at a position of a resist roller 126, it is fed again so as to coincide with writing timing of the image formed on the photosensitive drum 110. A transfer charging unit 127 transfers the toner image developed onto the fed transfer sheet. A separation charging unit 128 separates the transfer sheet after completion of the transferring operation from the photosensitive drum 110. The toner remaining on the surface of the photosensitive drum 110 without being transferred is collected by a cleaner 111.

A conveying belt 129 conveys the transfer sheet after completion of the transferring process to a fixing unit 130 and fixes it by, for example, heating. A flapper 131 controls a conveying path of the transfer sheet after completion of the fixing process to the arranging direction of either a sorter 132 or an intermediate tray 137. Feeding rollers 133 to 136 temporarily reverse (multiplex) the transfer sheet after completion of the fixing process onto the intermediate tray 137 and feed it or feed it without reversing (duplex). A re-feeding roller 138 again conveys the transfer sheet put on the intermediate tray 137 to the position of the resist roller 126. As will be explained hereinafter, the controller unit 150 has a microcomputer, an image processing unit, and the like and controls the image forming operation in accordance with instructions from an operating unit 140.

Figure 3:
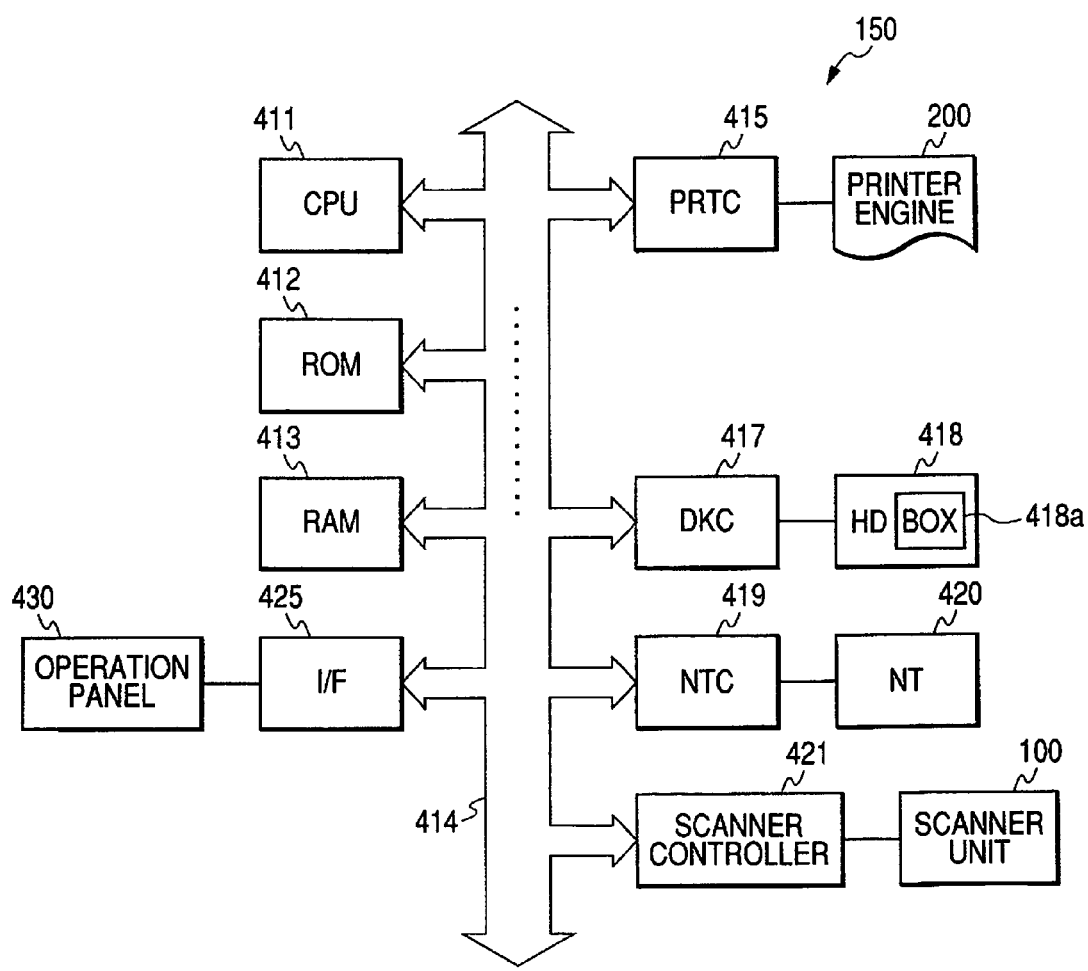
FIG. 3 is a diagram showing a hardware construction of a controller unit 150 of the printer 40.

FIG. 3 is a diagram showing a hardware construction of the controller unit 150 of the printer 40. The printer 40 has a construction in which a CPU 411, a ROM 412, a RAM 413, a printer controller (PRTC) 415, a disk controller (DKC) 417, a network controller (NTC) 419, a scanner controller 421, and an operation interface (I/F) 425 which are well known are connected through a system bus 414. The printer unit (printer engine) 200 is connected to the printer controller (PRTC) 415. A hard disk drive (HD) 418 is connected to the disk controller (DKC) 417. As will be explained hereinafter, a box (BOX) 418a in which a document or the like as an example of document data is stored is allocated as a part of a memory area to the hard disk drive (simply referred to as a hard disk hereinbelow) 418. A network apparatus (NT) 420 for making connection control between the printer 40 and the network 10 is connected to the network controller (NTC) 419. The scanner unit 100 is connected to the scanner controller 421. An operation panel 430 is connected to the operation I/F 425.

The CPU 411 is a central processing unit for controlling the whole apparatus. The CPU 411 uses the RAM 413 as a work area and executes various processes necessary for printing in accordance with various programs stored in the ROM 412. The system bus 414 is a path for transmitting and receiving data and control signals to/from the foregoing units. Besides the various programs, character pattern data (font data), and the like have been stored in the ROM 412. Document data, image data, font data, and the like which are downloaded from a Web server (not shown) or output data which is developed into an image and downloaded from a print server (not shown) are stored into the RAM 413 or the HD 418 in accordance with a request. In accordance with the program stored in the ROM 412, the CPU 411 forms the character pattern data or image data (bit map data) from the document, data, image data, or font data supplied from the Web server or print server and develops it into a print buffer in the printer controller 415.

The printer controller 415 outputs a print control signal formed on the basis of the bit map data to the printer engine 200. When the data is transmitted and received among the client computer 30, the file server 20, and the print server (not shown) through the network 10, the network controller 419 controls the operation of the network apparatus (NT) 420.

Figure 4:
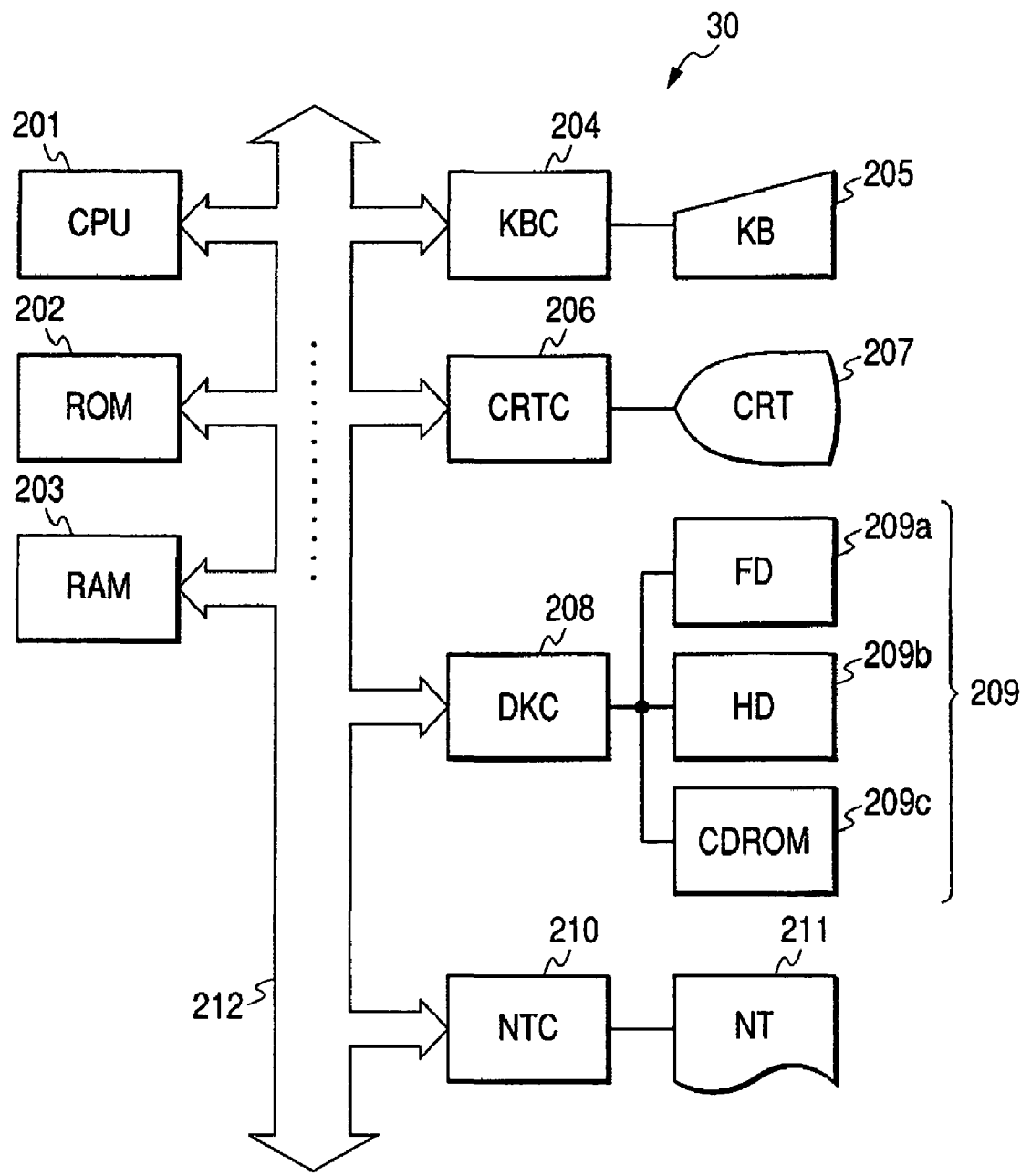
FIG. 4 is a diagram showing a hardware construction of a client computer 30 and a file server 20.

FIG. 4 is a diagram showing a hardware construction of the client computer 30 and the file server 20. Since all of the plurality of client computers 30 and the file server 20 have the same construction, only the client computer 30 is shown here. A CPU 201 is a central processing unit for controlling the whole apparatus and executing an arithmetic operating process. A ROM 202 is a read only memory in which a system activating program, a basic I/O program, character pattern data (font data) to convert character codes into bit patterns, and the like have been stored. A RAM 203 is a random access memory for temporarily storing data which is used for the arithmetic operation of the CPU 201, an arithmetic operation result, a character pattern data train, graphic data, or image data converted from the character codes in order to display them, and the like.

A keyboard control unit (KBC) 204 receives key input data (character code, control code) from a keyboard (KB) 205 and transfers it to the CPU 201. A display control unit (CRTC) 206 reads out the character pattern data train stored in the RAM 203 and transfers it to a display apparatus (CRT) 207. The CRT 207 receives the character pattern data train, graphic data, or image data from the CRTC 206 and displays it onto a display screen.

A disk control unit (DKC) 208 controls an access to external storing devices 209. In the embodiment, a floppy (registered trademark) disk drive (FD) 209a, a hard disk drive (HD) 209b, and a CD-ROM drive 209c are connected as external storing devices 209. A character development processing program for reading out the character pattern data (font data) and converting it into the bit map data, a graphic development processing program for processing the graphic data, an image data processing program for processing the image data, and the like have been stored in the HD 209*b*. A printer driver and related data for executing a printing process shown in flowcharts of FIGS. 10, 11, and 12, which will be explained hereinafter, are supplied from the external storing devices 209 such as floppy (registered trademark) disk drive (FD) 209*a* and CD-ROM drive 209*c*. A network control unit (NTC) 210 controls the operation of a network apparatus (NT) 211. A system bus 212 transfers data among the above units.

Figure 5:
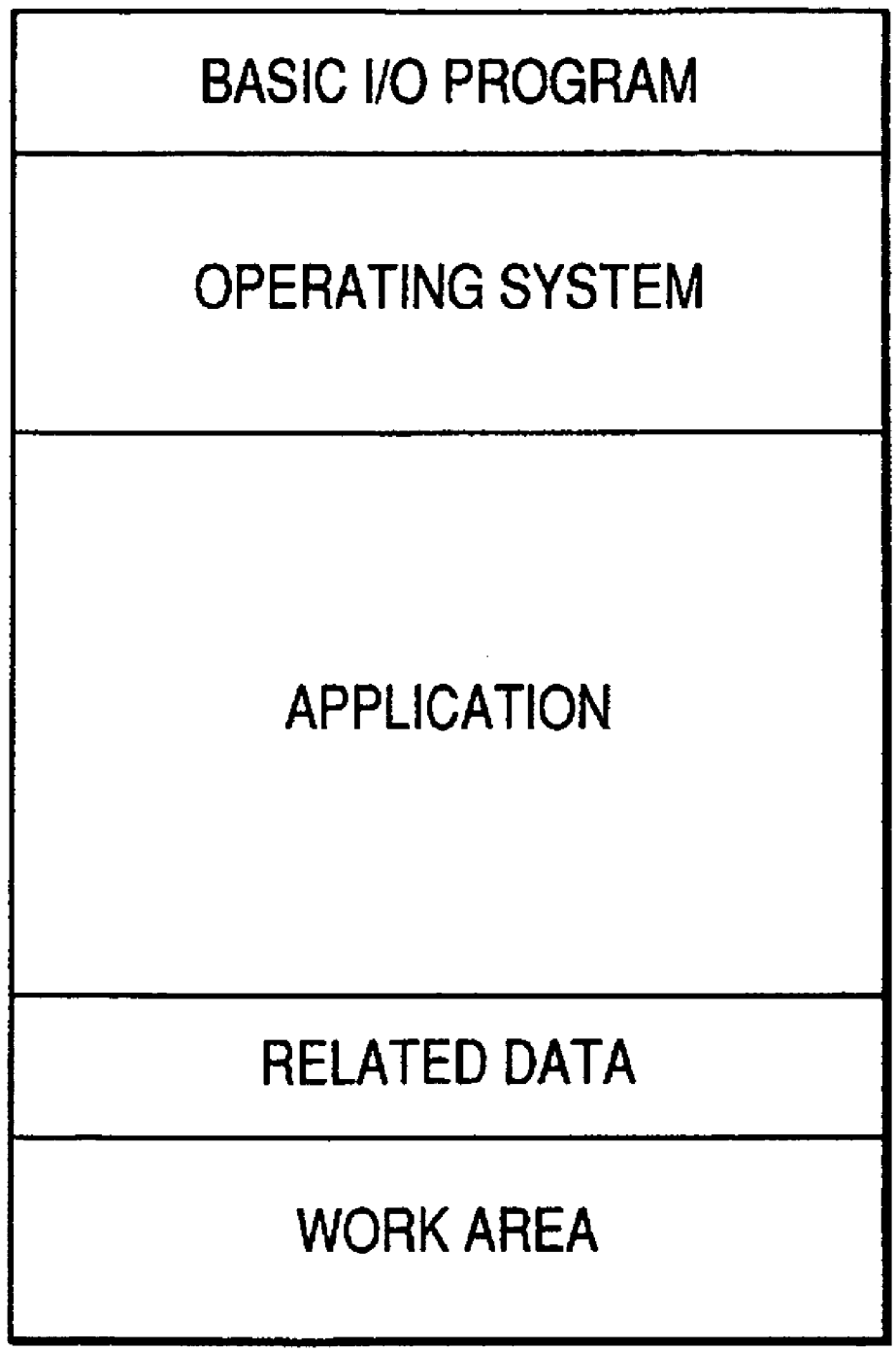
FIG. 5 is a diagram showing a memory map in a RAM 203.

FIG. 5 is a diagram showing a memory map in the RAM 203. The memory map in the RAM 203 at the time of executing the printing process shown in the flowcharts of FIGS. 10, 11, 12, and the like is shown here. The basic I/O program has been stored in the hard disk (HD) 209*b* and read out therefrom and stored into the RAM 203 by the system activating program in the ROM 202. When a power source is turned on in the state where the application program and the related data have temporarily been installed into the HD 209*b* from the floppy (registered trademark) disk drive (FD) 209*a* or the CD-ROM drive 209*c* as an external storing device 209, by loading the application program from the HD 209*b* into the RAM 203, it can be executed. The application program can be also executed by directly loading it into the RAM 203 from the floppy (registered trademark) disk drive or the CD-ROM drive 209*c* without temporarily installing it into the HD 209*b*. In the case of the file server 20, a printer information table has been provided in an area of the related data.

Figure 6:
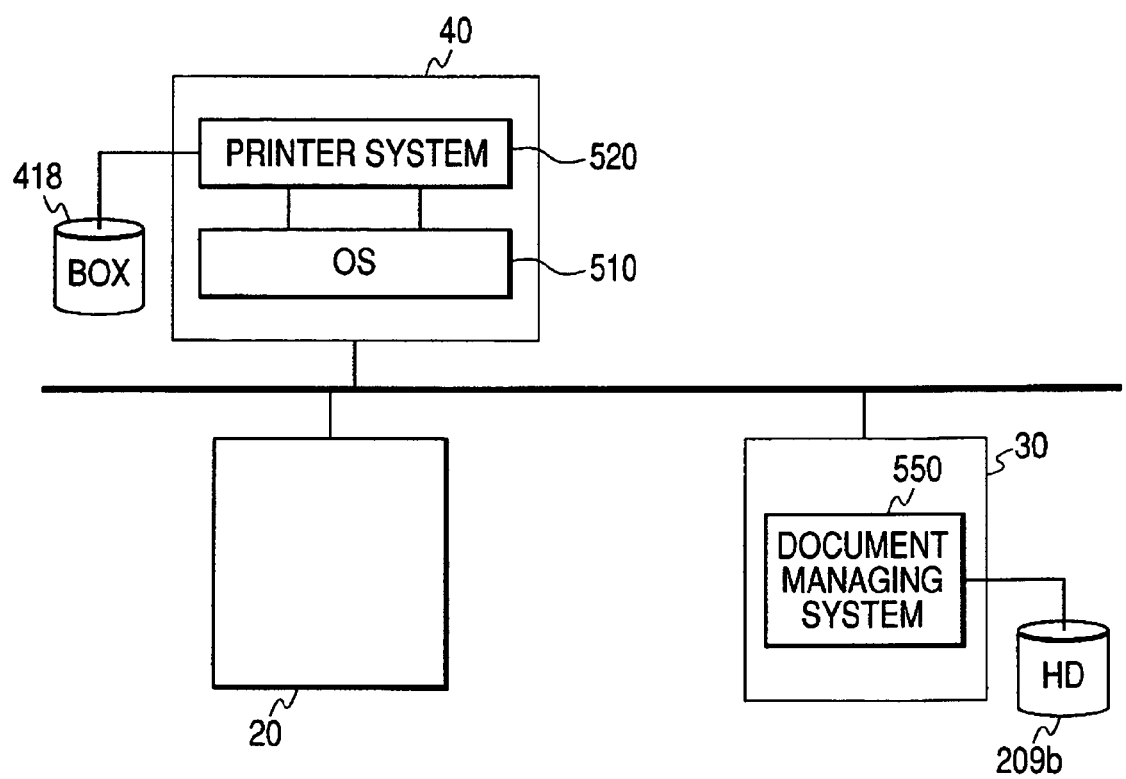
FIG. 6 is a diagram showing a construction of software installed in a document print system.

FIG. 6 is a diagram showing a construction of software installed in a document print system. A printer system 520 as a control program which is stored in the HD 418 and operates under a basic operating system (OS) 510 has been stored in the controller unit 150 of the printer 40. The printer system 520 is stored in the box (BOX) 418*a* allocated in the HD 418 and manages the print data, job ticket, and the like of each document corresponding to an ID as an example of information which specifies the print data. As an OS, "Embedded Windows (registered trademark)", "Linux (registered trademark)", or the like can be mentioned. Similarly, a document managing program 550 as software which is stored in the HD 209*b* and operates under the OS has been installed in the client computer 30. The document managing program (DMS) 550 is software for managing the document and executes processes such as storage and search of the document, management of the user, and the like.

Figure 7:
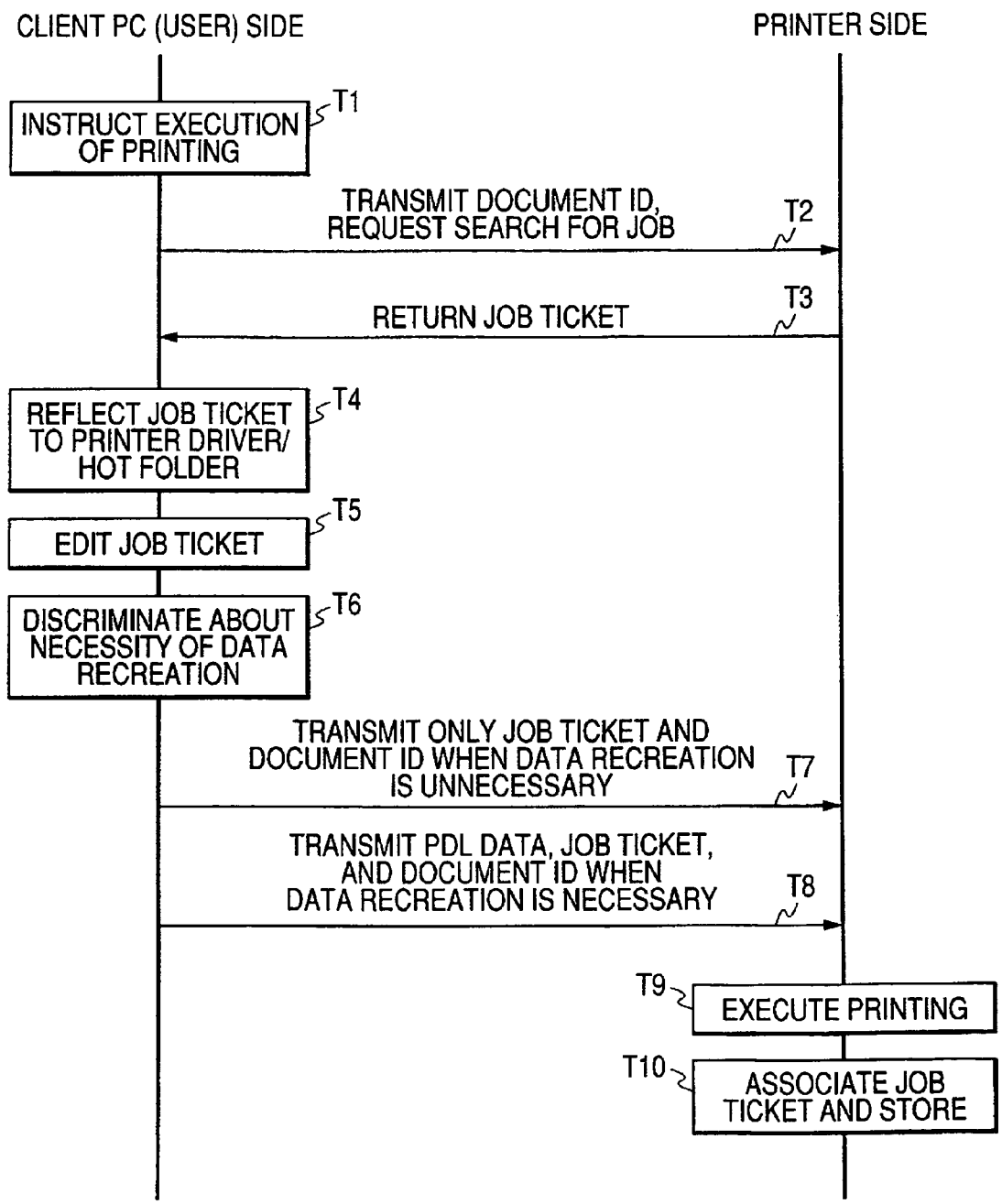
FIG. 7 is a diagram showing a flow of the print processing operation between the client PC 30 and the printer 40.
Figure 8:
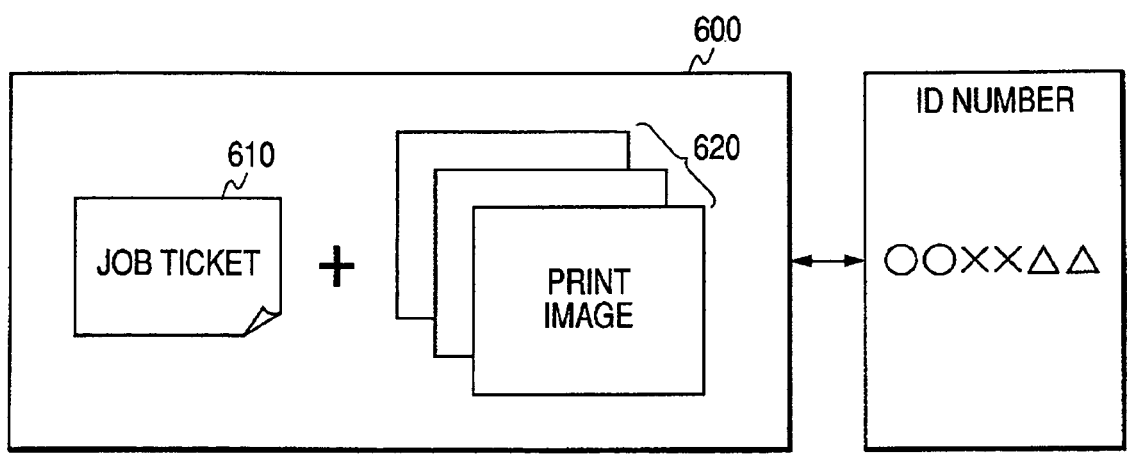
FIG. 8 is a diagram showing a set of data with which a job ticket and print data have been associated.

The print processing operation of the document print system having the above construction will now be described. FIG. 7 is a diagram showing a flow of the print processing operation between the client PC 30 and the printer 40. First, the association between the job ticket and the print data will be explained. FIG. 8 is a diagram showing a set of data with which the job ticket and the print data have been associated. A job ticket 610 and print data 620 have been stored in the box (BOX) 418*a* allocated to the HD 418 in the printer 40. The print data (PDL data for printing) 620 is associated with the job ticket 610 page by page. An ID number (document ID) to associate with the document stored in the external storing device 209 has been allocated to a set 600 of data comprising the job ticket 610 and the print data 620. The number of job tickets associated with the print data is not limited to one but a plurality of different job tickets may be also associated. FIG. 9 is a diagram schematically showing the contents of the job ticket 610. The job ticket as an example of the print setting information may be described in a text format by using XML or may be also data in a binary format. Print style setting is shown in the job ticket 610. Besides the print style setting, information regarding the client computer and the like can be also included in the job ticket.

First, on the client PC side, the user selects the document to be printed from the external storing device 209, sets it into the printer driver or hot folder in the RAM 203, and instructs execution of the printing (T1). By this print executing instruction, the client PC 30 executes the document managing program (DMS) 550, thereby obtaining the document ID of the target document from the selected document and transmitting the obtained document ID to the printer 40. The client PC 30 requests a Printing System in the printer 40 to search whether or not the print data (PDL data for printing) stored in the box (BOX) exists (T2). The printer 40 executes the Printing System, searches the box (BOX) 418*a* in the HD 418 by using the document ID which is transmitted from the client, and if the relevant print data is found, returns the associated job ticket 610 to the client PC 30 (T3).

The client PC 30 reflects the returned job ticket 610 to a user interface (UI) of the printer driver or the hot folder (T4). The user executes the editing operation such as addition, deletion, or the like of the job ticket 610 (T5). Further, the contents of the job ticket 610 subjected to the editing operation is checked and whether or not it is necessary to recreate the print data is discriminated (T6). If it is unnecessary to recreate the print data, the client PC 30 transmits only the job ticket 610 changed by the editing operation of the process T5 and the document ID to the printer 40 (T7). If it is necessary to recreate the print data, the client PC 30 recreates the print data and transmits the print data 620 which was newly formed, the job ticket 610, and the document ID to the printer 40 (T8).

When only the changed job ticket 610 and the document ID are sent, the printer 40 executes the printing by using the print data corresponding to the document ID (T9). The changed (edited) job ticket 610 is stored in association with the target print data (PDL data for printing) (T10). When the print data (PDL data for printing), the changed job ticket, and the document ID are sent, the printer 40 executes the printing by using the transmitted PDL data for printing (T9). The print data and the job ticket are stored so as to be associated with each other and, further, the document ID is stored so as to be associated with them (T10). In this manner, the printing is efficiently executed on a document unit basis in the document print system. It is also possible to construct in such a manner that if the job ticket is not edited in the process T5, in the process T7, only the document ID is transmitted or a notification showing that it is unnecessary to edit the job ticket and the document ID are transmitted to the printer and the printing is executed by using the job ticket and the print data stored as they are in the box of the printer.

Figure 10:
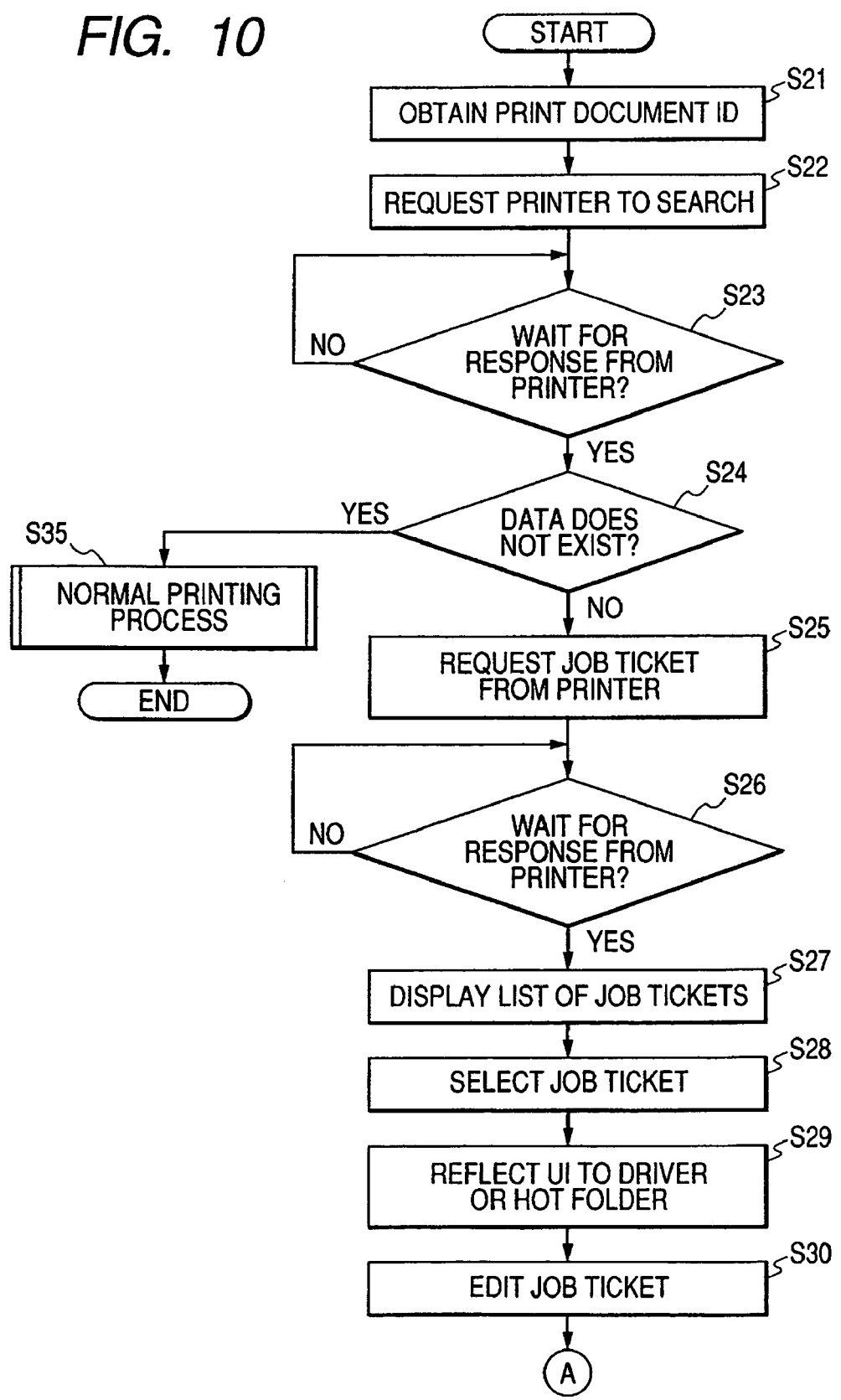
FIG. 10 is a flowchart showing a print processing procedure in the client PC 30.
Figure 11:
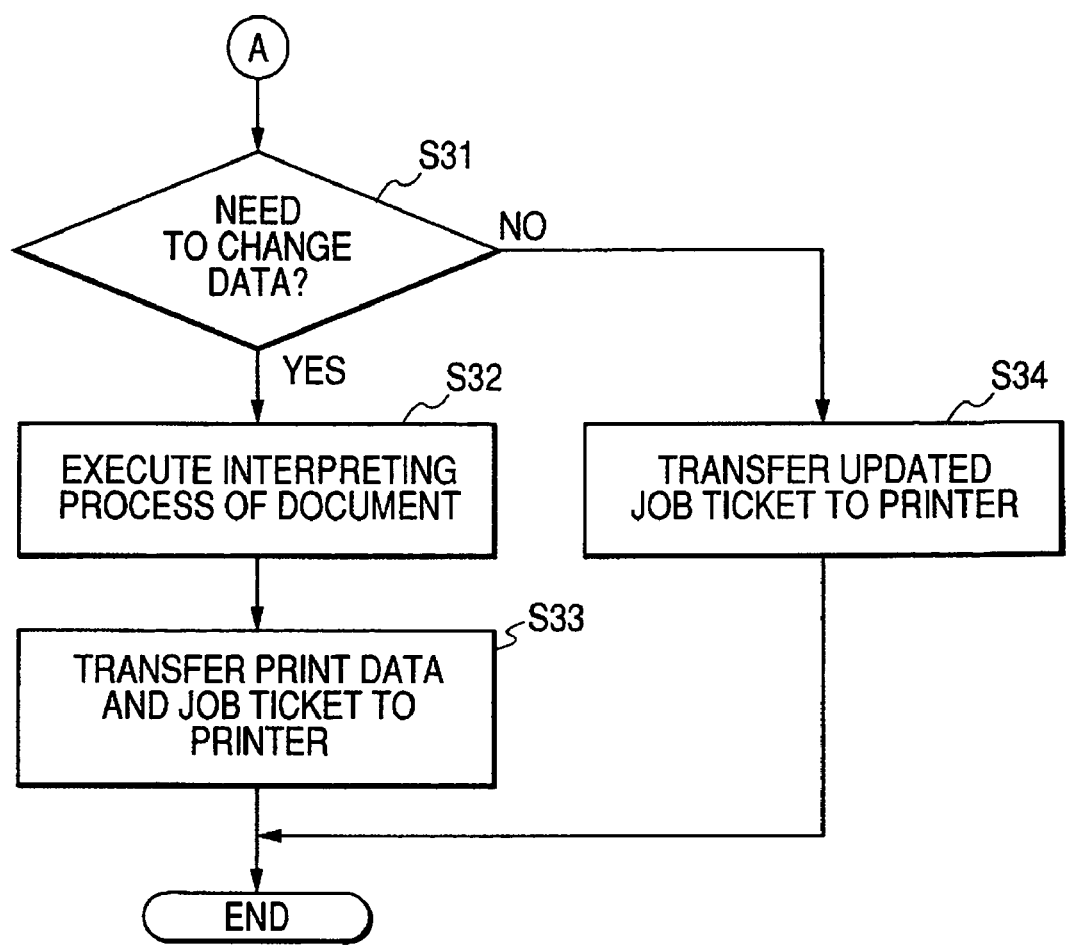
FIG. 11 is a flowchart showing the print processing procedure in the client PC 30 and is a sequel to FIG. 10.

Subsequently, specific processes in each of the client PC 30 and the printer 40 will be described. FIGS. 10 and 11 are flowcharts showing a print processing procedure in the client PC 30. This processing program has been stored in the external storing device 209. When the user instructs the print start, the processing program is temporarily loaded into the RAM 203 and, thereafter, executed by the CPU 201. This processing program can cope with the case where the print data has already been stored in the box (BOX) 418*a* on the printer 40 side.

First, the ID information (document ID) of the document to be printed is obtained (step S21). The ID information is an ID number of the document managed by the document managing program (DMS) of the client PC side. This ID information is also managed as the same ID number in the box (BOX) 418*a* of the printer 40. This ID number is inputted into the printer 40 and the Printing System is requested to discriminate whether or not the print data of the target ID number exists (step S22). The print system waits until information of the search result is sent from the printer 40 (step S23). When the search result is sent, the search result returned from the printer 40 is checked and whether or not the print data (PDL data for printing) of the target ID number exists is discriminated (step S24). If the print data (PDL data for printing) of the target ID number does not exist in the box (BOX) 418a of the printer 40, a normal printing process, which will be explained hereinafter, is executed (step S35) and the processing routine is finished.

If the print data (PDL data for printing) of the target ID number exists, the printer 40 is requested to send the job tickets stored, as a set, with the print data of the target ID number (step S25). The print system waits until there is a response from the printer 40 in accordance with the requested contents (job tickets) (step S26). When the response is made from the printer 40, a list of job tickets returned from the printer 40 is displayed (step S27). In the printer 40, a plurality of job tickets are associated with one PDL data for printing. Therefore, among the plurality of job tickets, the job ticket which is used upon printing can be selected by the user. For example, information of the plurality of job tickets is displayed on the display 207 as follows.

Job ticket 1: A4, simplex, 4in1 from the upper Left position to the right, the number of print copies is 1, bind at the major side (left)

Job ticket 2: A4, duplex, 4in1 from the upper left position to the right, the number of print copies is 3, bind at the major side (left)

Job ticket 3: A4, simplex, 4in1 from the upper left position to the right, the number of print copies is 1, bind at the major side (right)

The job ticket which is the same as or closest to the job ticket which the user wants to print is selected from the list in accordance with the operation of the user (step S28). The information of the selected job ticket is reflected to the printer driver or the hot folder so that the user doesn't need to set the job ticket on a user interface (UI) display screen of the printer driver or the hot folder (step S29). For example, if the user selects the job ticket 2 from the list, information of "A4, duplex, 4in1 from the upper left position to the right, the number of print copies is 3, bind at the major side (left)" is set so that the user doesn't need to especially select the job ticket in a selecting column of the UI display screen of the printer driver or the hot folder. If the user wants to further edit the information of the selected job ticket, edition which is performed by the user is accepted on the UI display screen of the printer driver or the hot folder (step S30). For example, there occurs a case where the user wants to change the number of print copies to 5 in the state where the UI display screen to which the job ticket 2 has been reflected is displayed. In such a case, the number of print copies is changed from the value 3 to the value 5.

Whether or not it is necessary to change the print data by the information of the job ticket changed (edited) in step S30 is discriminated (step S31). This is because a case where a desired output cannot be obtained in the PDL data for printing which has already been stored in the box (BOX) on the printer side can occur by changing the information of the job ticket. In such a case, it is necessary to execute the data conversion (developing process) again and recreate new PDL data for printing on the basis of the information of the job ticket edited by the user. The information of the job ticket in which the PDL data for printing has to be recreated and the information of the job ticket in which the print data in the box (BOX) is used as it is without recreating it and can be printed are shown as examples. As information of the job ticket in which the PDL data for printing has to be recreated, there can be mentioned change information of the output sheet size, page layout information (page layout), orientation of the printing, page frame, and the like. As information of the job ticket in which it is unnecessary to recreate the PDL data for printing, there can be mentioned change information of the number of print copies, printing method such as simplex/duplex printing or the like, binding direction, paper ejecting method, and the like.

If it is necessary to recreate the PDL data for printing in step S31, the document is interpreted and new PDL data for printing is formed on the basis of the information of the job ticket (step S32). The formed PDL data for printing and the edited job ticket information are transferred as a set to the printer 40 (step S33). After that, the processing routine is finished. If it is unnecessary to recreate the PDL data for printing in step S31, only the edited job ticket information and document ID are transferred to the printer 40 (step S34). After that, the processing routine is finished.

Figure 12:
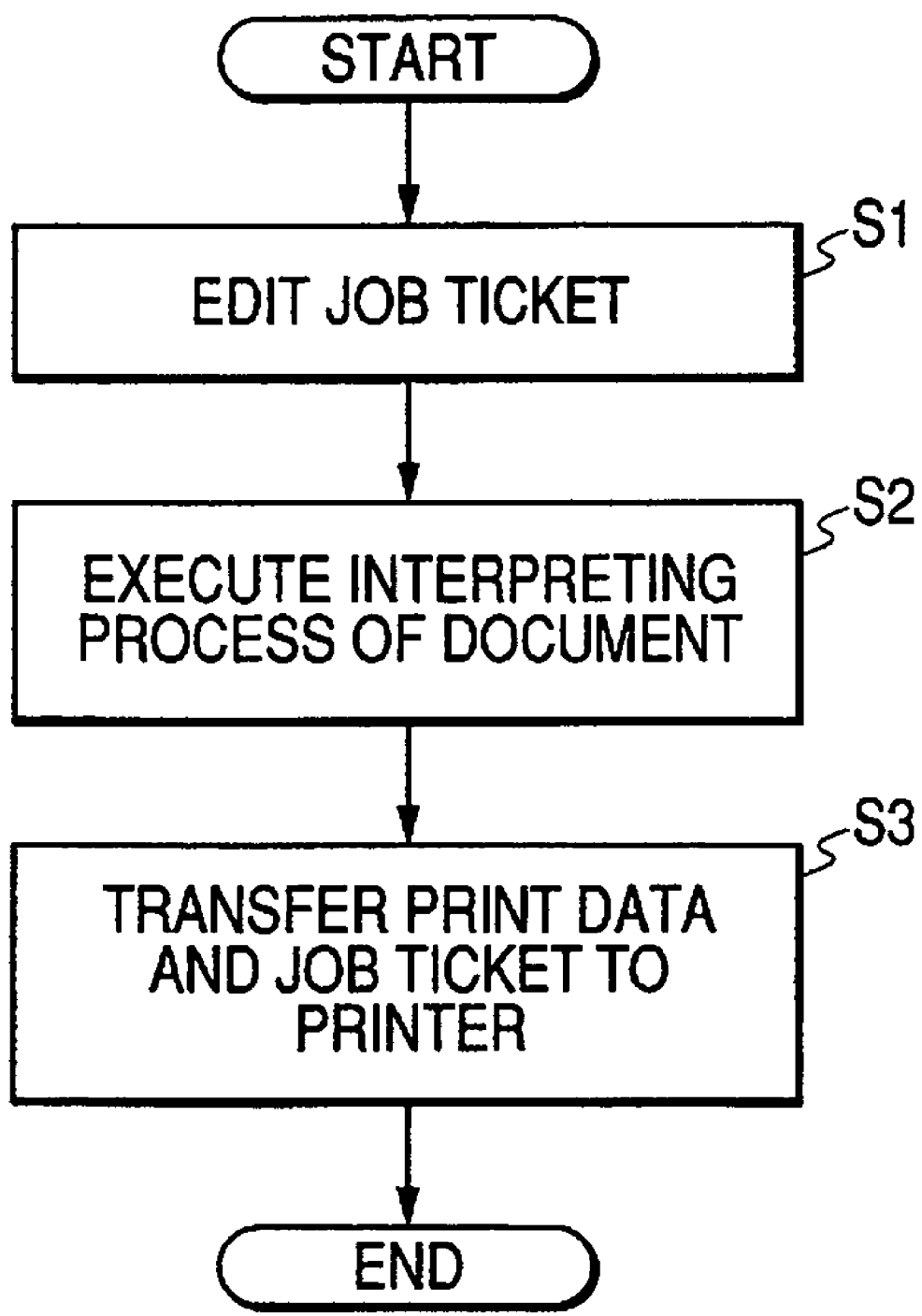
FIG. 12 is a flowchart showing a normal print processing procedure in step S35.

FIG. 12 is a flowchart showing a normal print processing procedure in step S35. This processing program is stored in the external storing device 209, temporarily loaded into the RAM 203, and thereafter, executed by the CPU 201. Particularly, this processing program is executed in the case where the document to be printed is the first print target and in the case where even if such a document has already been printed, it is necessary to execute the developing process (creation) again due to the change in the job ticket on the user interface (UI).

First, the document to be printed is designated by the user and the job ticket (setting instruction of the print style) which is edited on the user interface (UI) is accepted (step S1). As contents of the job ticket to be edited, as shown in FIG. 9, the sheet size, orientation of the printing, page layout such as page layout information or the like, the number of print copies, designation of the simplex/duplex printing, and the like can be mentioned. On the basis of the edited job ticket information; the target document is interpreted and converted into a PDL language such as LIPS (registered trademark), PCL (registered trademark), PS (registered trademark), or the like (step S2). A process for inputting the job ticket information formed in step S1 and the print data formed in step S2 as a set to the printer 40 is executed (step S3). After that, the processing routine is finished. On the printer 40 side, when those data is inputted, a printing process for the documents which are not stored in the box yet is executed.

As mentioned above, in the case where it is unnecessary to change the PDL data for printing stored in the box (BOX) of the printer side, the document is printed by using the PDL data for printing stored in the box (BOX). If it is necessary to change the PDL data for printing, PDL data for printing is recreated, thereafter, the PDL data for printing and the job ticket information are sent to the printer 40, and the printing process is executed. If the job ticket is not edited in step S30, it is also possible to construct in such a manner that, as mentioned above, in step S34, only the document ID is transmitted or a notification indicative of the absence of the edition of the job ticket and the document ID are transmitted to the printer 40 and the printing is executed by using the job ticket and the print data stored as they are in the box of the printer.

Figure 13:
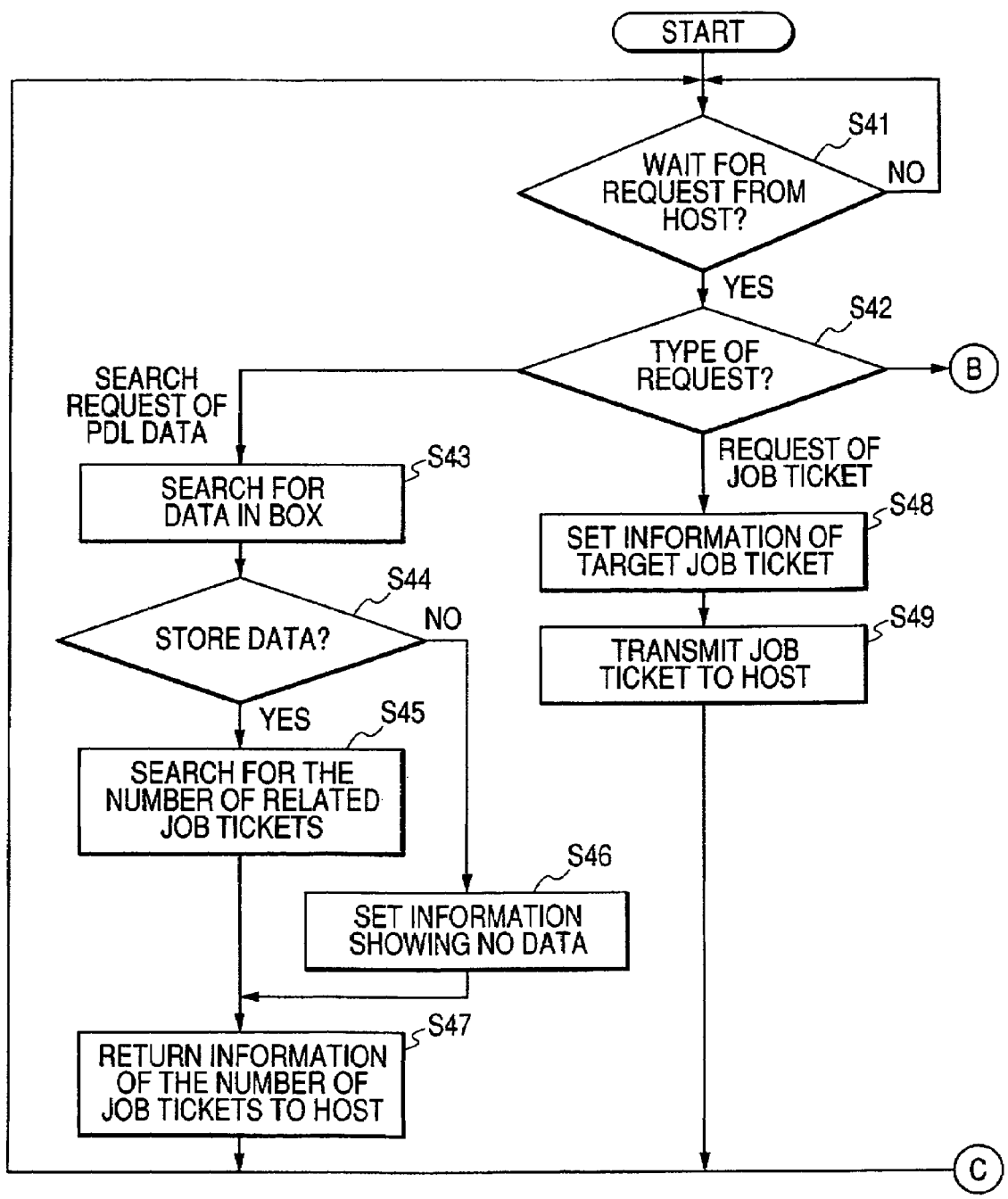
FIG. 13 is a flowchart showing a print processing procedure in the printer 40.
Figure 14:
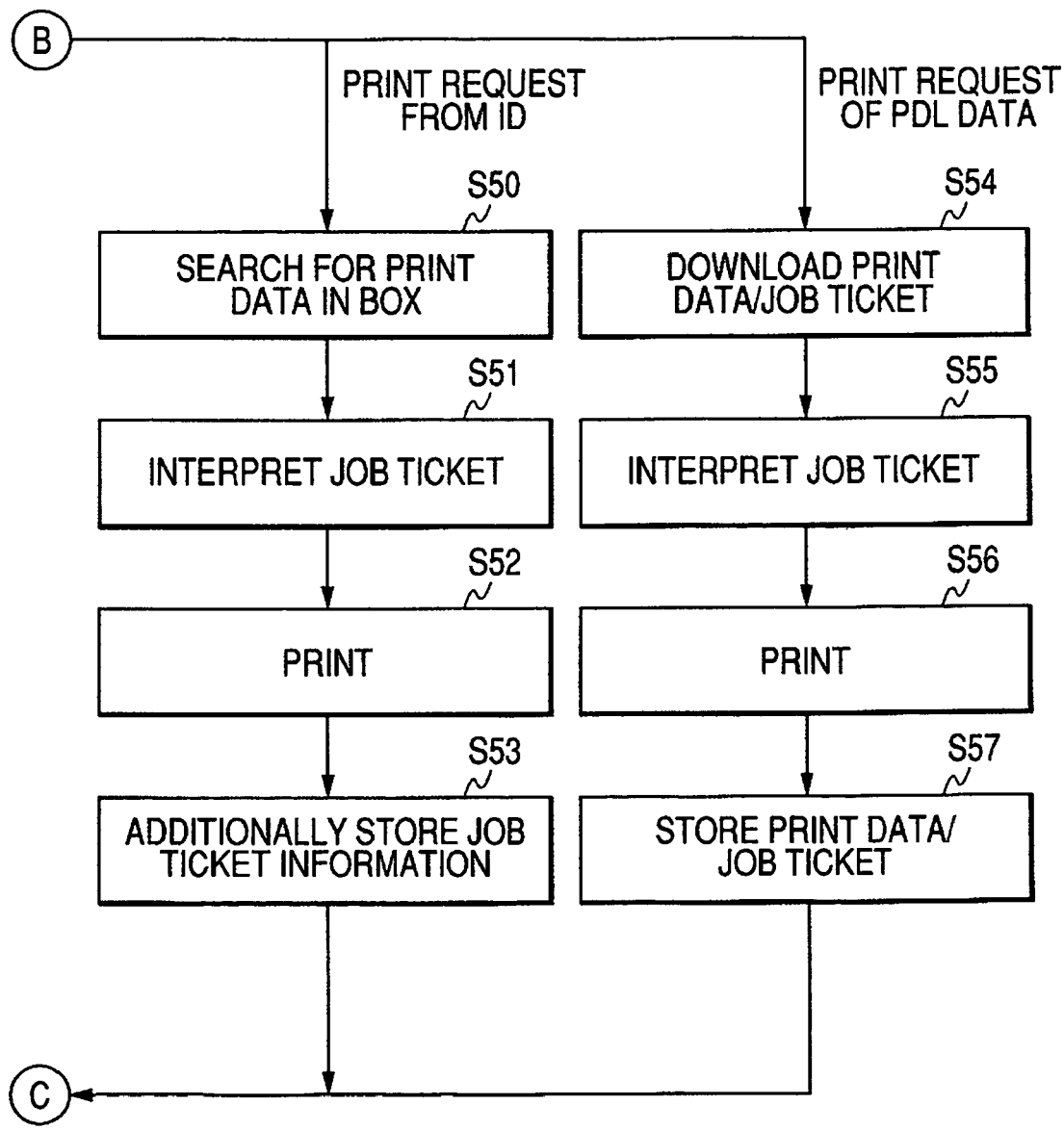
FIG. 14 is a flowchart showing a print processing procedure in the printer 40 and is a sequel to FIG. 13.

FIGS. 13 and 14 are flowcharts showing a print processing procedure in the printer 40. This processing program (printer system 520) is stored in the HD 418, temporarily loaded into the RAM 413, and thereafter, executed by the CPU 411. First, the print system waits for an input of a request of the print data, job ticket, or the like from the client PC 30 (step S41). If the request is inputted from the client PC 30, the contents of the request are discriminated (step S42).

As a result of the discrimination, if the request is a search request of the PDL data for printing of the desired ID number in step S22, the print data (PDL data for printing) is searched for in accordance with the target ID information (step S43). If the PDL data for printing of the target ID information does not exist, information showing that the target print data does not exist is set (step S46). If the PDL data for printing of the target ID information exists, the number of all of the job tickets associated with the PDL data for printing of the ID number is counted (step S45). Information showing the presence or absence of the job tickets and, if the job tickets exist, the number of job tickets are returned to the client PC 30 (step S47). After that, the processing routine is returned to step S41.

If the request is a request of the job ticket information in step S25 as a result of the discrimination of step S42, all of the information of the target job tickets is set (step S48). The set job ticket information is returned to the client PC 30 (step S49). Thereafter, the processing routine is returned to step S41.

If the request is a request of the printing from the ID information in step S34 as a result of the discrimination of step S42, the PDL data for printing stored in the box (BOX) 418a is searched for in accordance with the target ID number (step S50). The information of the job tickets sent from the client PC 30 is interpreted (step S51). At this time, since the information of the job tickets in which it is necessary to recreate the PDL data for printing is not included, the number of print copies, the printing method such as simplex/duplex or the like, the binding direction, the paper ejecting method, and the like are interpreted as information of the job tickets in which it is unnecessary to recreate the PDL data for printing. The printing process of the target PDL data for printing is executed in accordance with the interpreted job ticket information (step S52). The information of the job tickets which become the targets of the printing at this time is compared with the information of the job tickets stored in the past in association with the target PDL data for printing. Thus, if the same job ticket information does not exist here, the job ticket information is stored as new job ticket information in association with the target PDL data for printing (step S53). Thereafter, the processing routine is returned to step S41.

If the request is a print request of the PDL data for printing which has been recreated in step S33 as a result of the discrimination of step S42, the PDL data for printing and the job ticket information are downloaded from the client PC 30 (step S54). The job ticket information is interpreted (step S55). As for the interpretation of the information of the job tickets in which it is necessary to recreate the PDL data for printing, since the PDL data for printing has already been formed by the interpreting process on the host computer side, the information of the job tickets to be interpreted here is only the job ticket information in which it is unnecessary to recreate the PDL data for printing.

The printing process of the target PDL data for printing is executed in accordance with the interpreted job ticket information (step S56). The job ticket information which becomes the print target at this time and the PDL data for printing are stored so as to be associated with each other (step S57). In this instance, the ID number of the target document is also associated. After that, the processing routine is returned to the process of step S41.

According to the document print system of the first embodiment, the print data stored in the box of the printer side is efficiently used and the printing can be executed at a high speed. Even if the edited job ticket information was transferred from the client PC, the printing can be executed by efficiently using the print data stored in the box in the printer.

Second Embodiment

Figure 15:
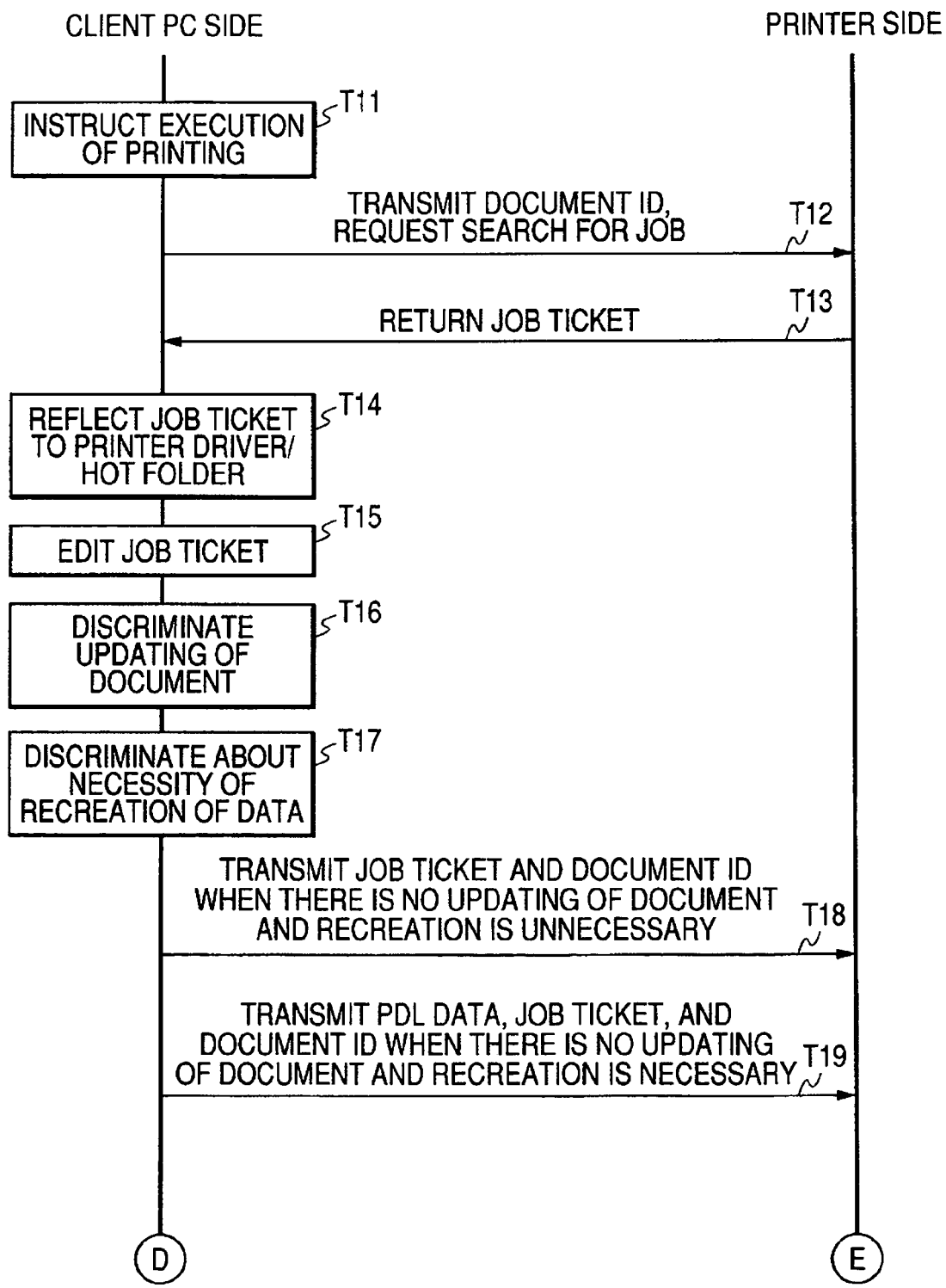
FIG. 15 is a diagram showing a flow for the print processing operation between the client PC 30 and the printer 40 in the second embodiment.
Figure 16:
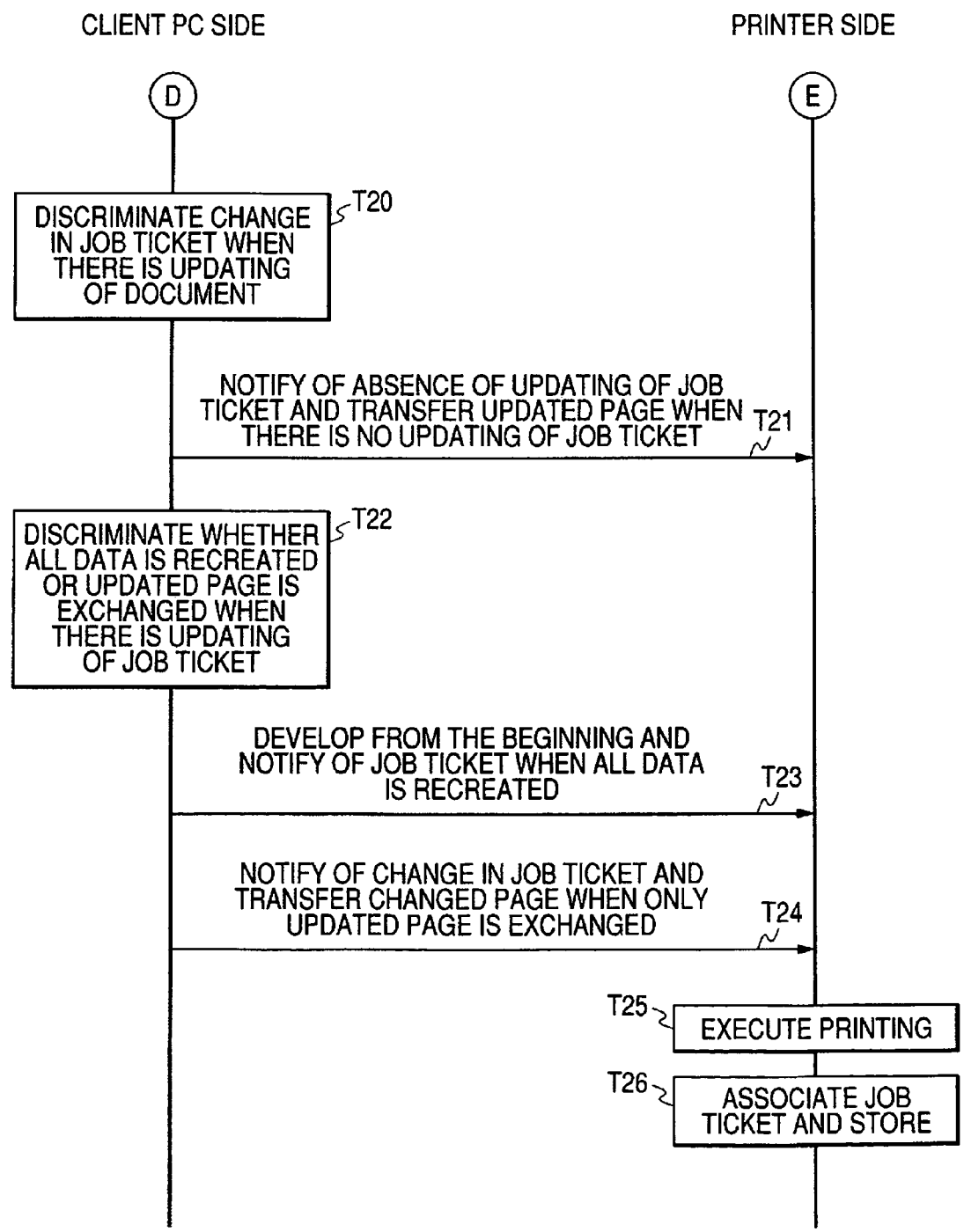
FIG. 16 is a diagram showing the flow for the print processing operation between the client PC 30 and the printer 40 and is a sequel to FIG. 15.

Since an apparatus construction of a document print system in the second embodiment is substantially the same as that of the first embodiment, its explanation is omitted. FIGS. 15 and 16 are diagrams showing a flow for the print processing operation between the client PC 30 and the printer 40 in the second embodiment. The second embodiment is characterized in that, when the document to be printed is updated, merely by sending the changed page to the printer side, the efficient printing is executed. Since processes T11 to T15 and T17 to T19 correspond to the processes T1 to T8 in FIG. 7 of the first embodiment, description of those processes is omitted.

After the editing operation such as addition, deletion, or the like of the job ticket 610 is executed by the user in the process T15, the client PC 30 discriminates whether or not the document has been updated (T16). If the document is not updated, the same processes T17 to T19 as those of T6 to T8 in the first embodiment are executed. That is, the contents of the job ticket 610 subjected to the editing operation are checked and whether or not it is necessary to recreate the print data is discriminated (T17). If it is unnecessary to recreate the print data, the client PC 30 transmits only the job ticket 610 changed by the editing operation of the process T15 and the document ID to the printer 40 (T18). If it is necessary to recreate the print data, the client PC 30 recreates the print data and transmits the print data which was newly formed, the job ticket 610, and the document ID to the printer 40 (T19).

If the document was updated, the presence or absence of the change in the job ticket is discriminated (T20). If there is no change in the job ticket, the information showing that there is no change in the job ticket is transferred and, further, only the changed page is developed and the PDL data for printing, information of the updated page, and the like of this page are transferred (T21). If the document was updated and, further, the job ticket was changed, whether it is necessary to develop all of the pages from the beginning again or it is sufficient to exchange only the updated page is discriminated (T22). This discrimination is made in accordance with the contents of the job ticket in a manner similar to the process T17. As information in which it is necessary to, recreate the PDL data for printing, the change information of the sheet size, page layout information (page layout), orientation of the printing, page frame, and the like can be mentioned. As information in which it is unnecessary to recreate the PDL data for printing, the change information of the number of print copies, printing method such as simplex/duplex or the like, binding direction, paper ejecting method, and the like can be mentioned.

If it is necessary to recreate all of the pages from the beginning, the PDL data for printing which was recreated from the beginning and the job ticket are transferred to the printer (T23). If it is unnecessary to recreate them from the beginning, the page concerned with the updating is developed again and the data of such a page, the information of the changed job ticket, and the information of the updated page are transferred to the printer 40 (T24).

On the printer side, when only the changed job ticket 610 and the document ID are sent in the process T18 in a manner similar to the process T7 in the first embodiment, the printer 40 executes the printing by using the print data corresponding to the document ID (T25). The changed job ticket 610 is stored in association with the target print data (PDL data for printing) (T26). When the print data (PDL data for printing), the changed job ticket, and the document ID are sent in the processes T19 and T23 in a manner similar to the process T8 in the first embodiment, the printer executes the printing by using the transmitted PDL data for printing (T25) and stores the print data and the job ticket in association with each other and, further, the document ID is stored in association with them (T26). When the data of the updated page and the information of the updated page are sent in the processes T21 and T24, the data stored in the box (BOX) 418a and the target page are exchanged to the PDL data for printing transmitted from the client PC 30 on the basis of the information of the updated page and the printing process is executed (T25). The updated PDL information is stored in association with the document ID and, further, with the information of the job ticket (T26).

Figure 17:
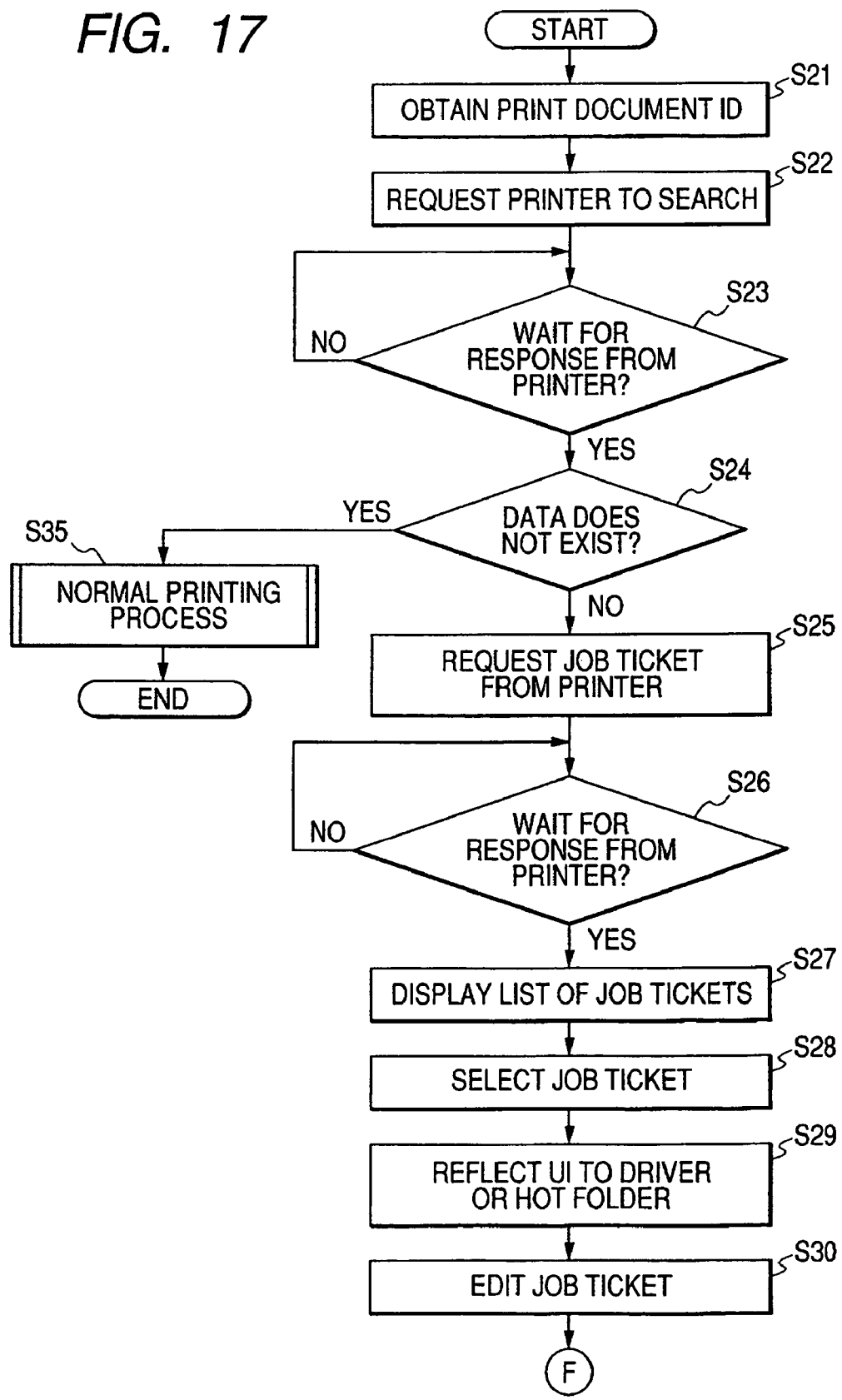
FIG. 17 is a flowchart showing a print processing procedure in the client PC 30.
Figure 18:
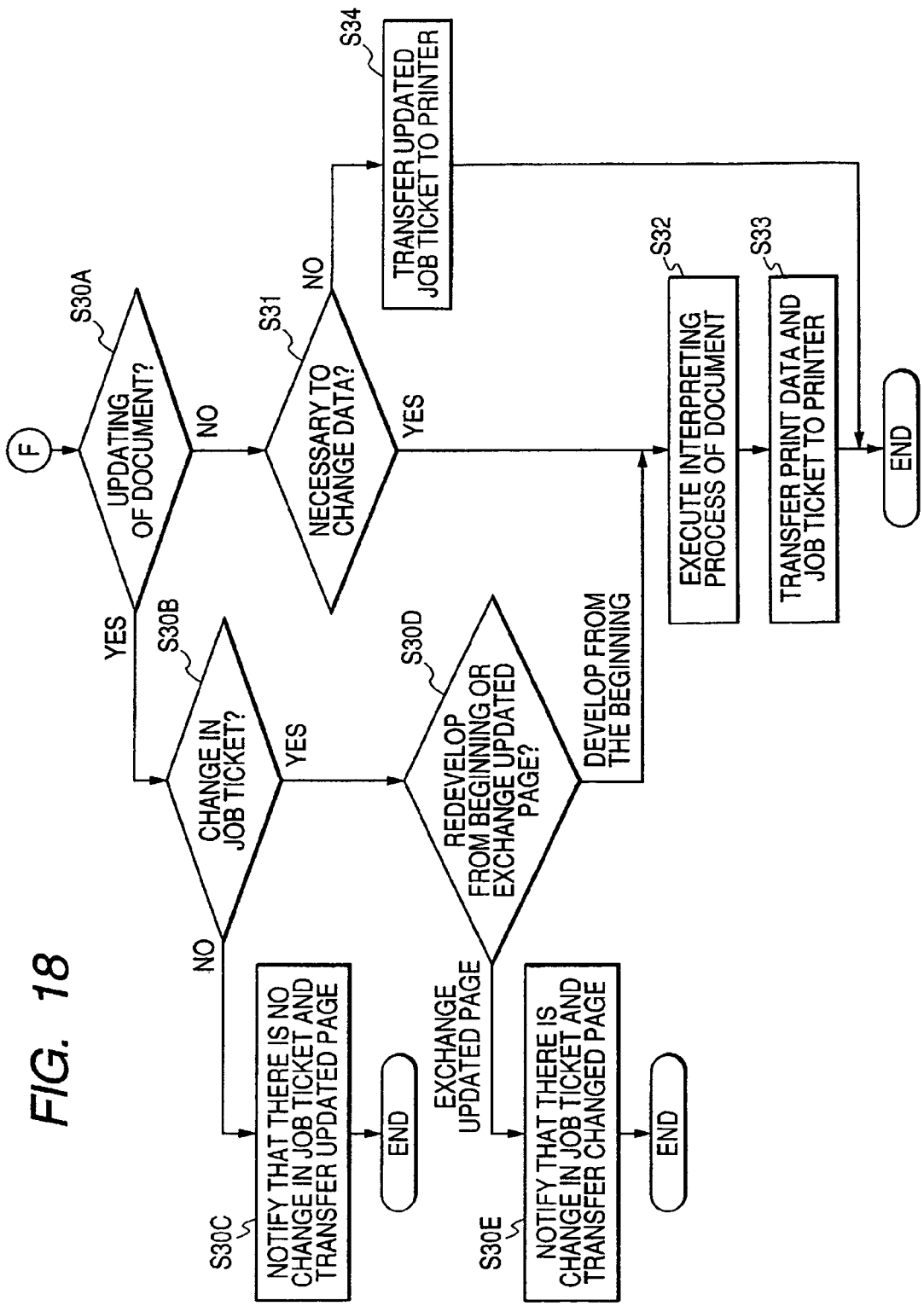
FIG. 18 is a flowchart showing the print processing procedure in the client PC 30 and is a sequel to FIG. 17.

FIGS. 17 and 18 are flowcharts showing a print processing procedure in the client PC 30. This processing program has been stored in the external storing device 209. When the user instructs the print start, the processing program is temporarily loaded into the RAM 203 and, thereafter, executed by the CPU 201. The same processing steps as those in FIGS. 10 and 11 in the first embodiment are designated by the same step numbers and their description is omitted here.

After the edition which is executed by the user is accepted on the UI display screen of the printer driver or the hot folder in step S30, whether or not the document has been updated is discriminated (step S30A). If the document is not updated, step S31 follows and a process similar to that in the first embodiment is executed. If the document has been updated, whether or not the job ticket has been changed is discriminated (step S30B). If the job ticket is not changed, the information showing that there is no change in the job ticket is transferred, only the changed page is developed, and the data and information of the updated page of such a page are transferred to the printer 40 (step S30C). After that, the processing routine is finished. If the job ticket has been changed in step S30B, whether it is necessary to develop all of the pages from the beginning again or it is sufficient to exchange only the updated page is discriminated (step S30D). This discrimination is made it accordance with the contents of the job ticket. If it is necessary to develop all of the pages from the beginning, the processing routine advances to step S32 and a process similar to that in the first embodiment is executed. If it is sufficient to exchange only the updated page, the page concerned with the updating is developed again and the data of such a page, the information of the changed job ticket, and the information of the updated page are transferred to the printer 40 (step S30E). After that, the processing routine is finished.

Figure 19:
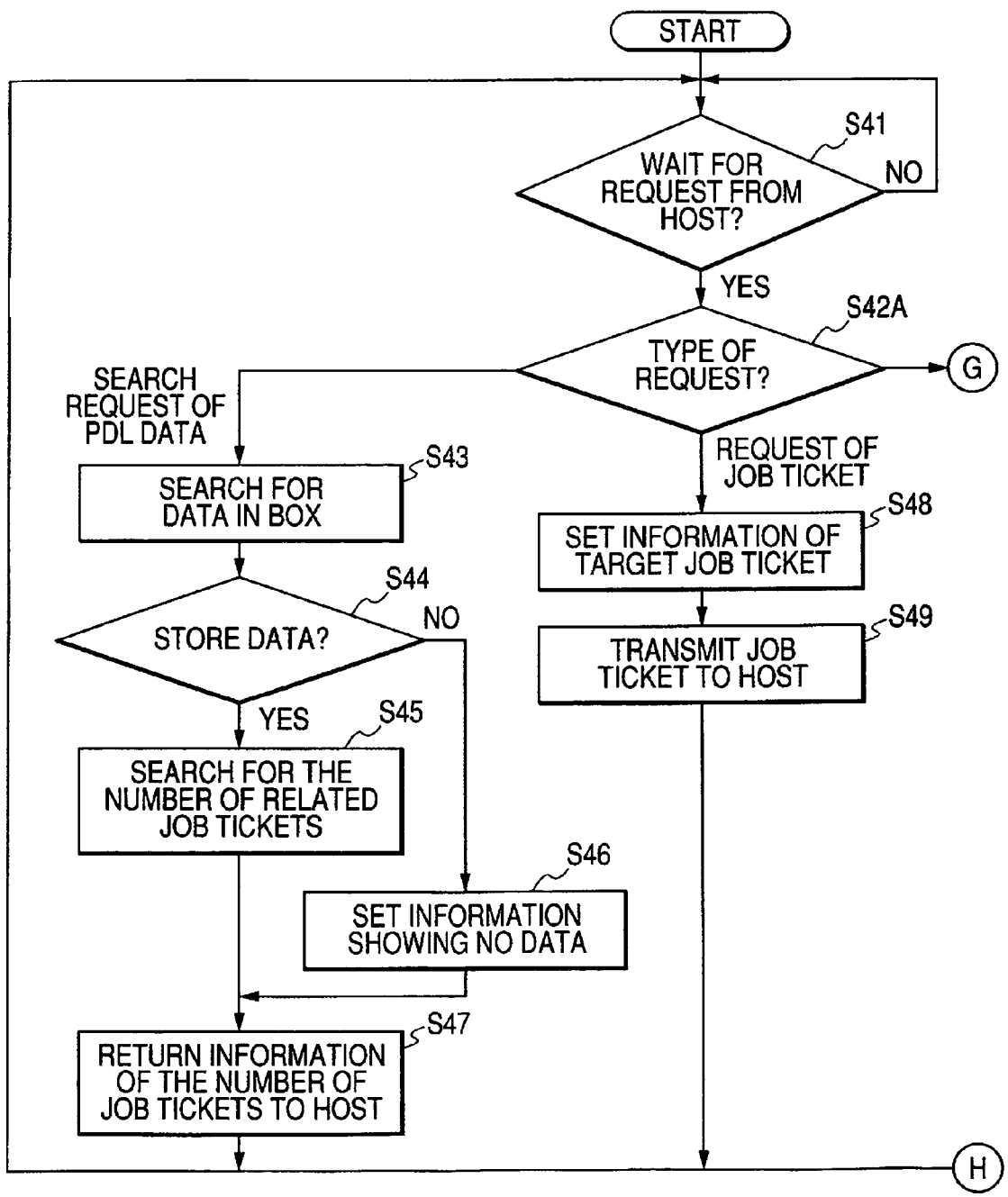
FIG. 19 is a flowchart showing a print processing procedure in the printer 40.
Figure 20:
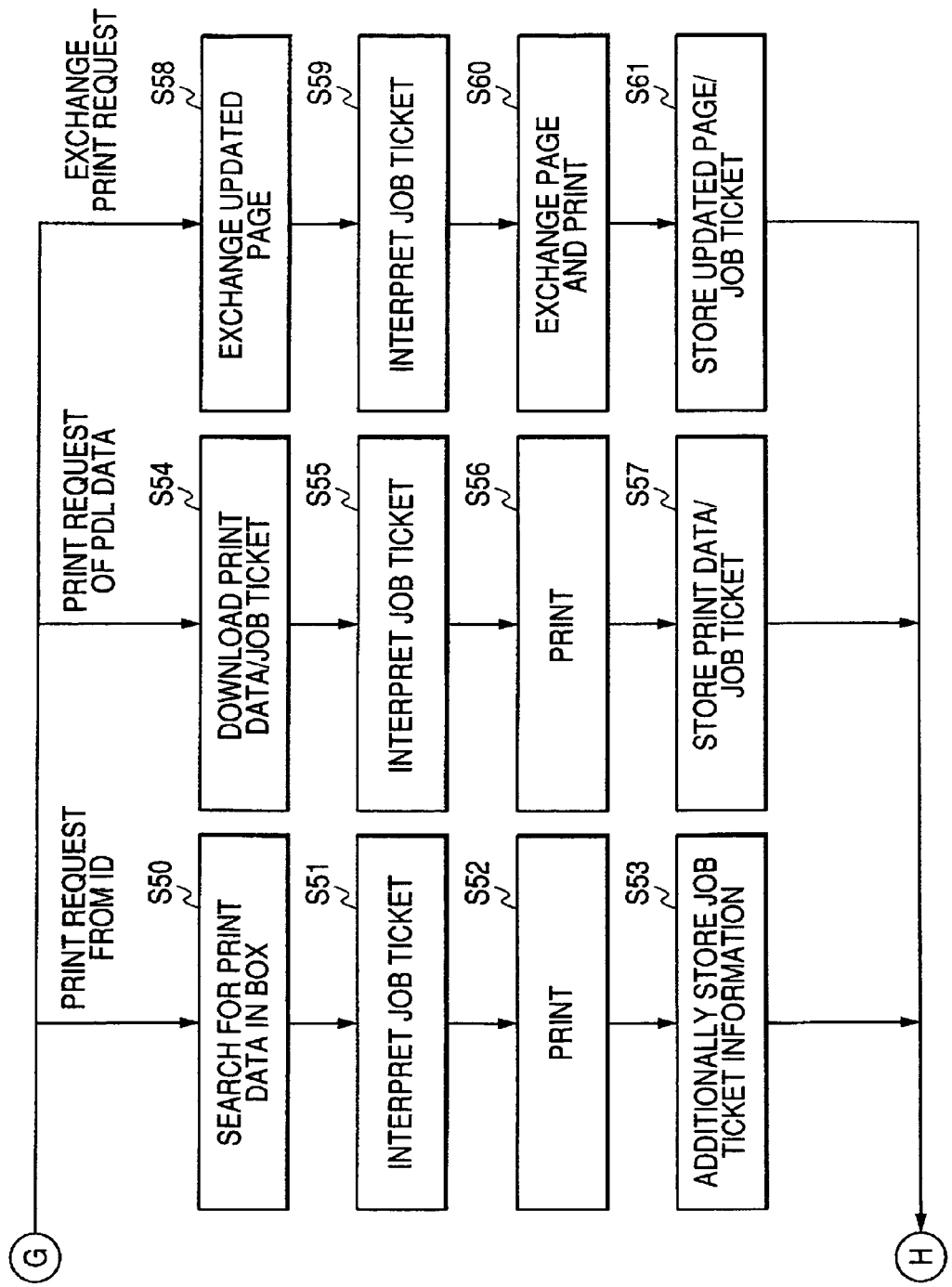
FIG. 20 is a flowchart showing the print processing procedure in the printer 40 and is a sequel to FIG. 19.

FIGS. 19 and 20 are flowcharts showing a print processing procedure in the printer 40. This processing program (printer system 520) is stored in the HD 418, temporarily loaded into the RAM 413, and thereafter, executed by the CPU 411. The same processing steps as those in FIGS. 13 and 14 in the first embodiment are designated by the same step numbers and their description is omitted here.

When a request is issued from the client PC 30, the contents of the request are discriminated (step S42A). If the request is an exchange print request of the updated page in steps S30C and S30E as a result of the discrimination, data regarding the updated page is downloaded from the client PC 30 and, if the job ticket has been exchanged, the job ticket information is downloaded (step S58). The job ticket information is interpreted (step S59). An exchange printing process of the target PDL data for printing is executed in accordance with the interpreted job ticket information (step S60). The information of the job ticket which becomes the print target at this time is compared with the job ticket information stored in the past in association with the target PDL data for printing. If the same job ticket information does not exist here, the job ticket information is stored as new job ticket information in association with the target PDL data for printing (step S61). Thereafter, the processing routine is finished.

According to the document print system in the second embodiment as mentioned above, even if the document was updated, it is sufficient to execute the minimum operations such as creation and transfer of the data. The printing can be executed by effectively using the PDL data for printing stored in the box (BOX).

The invention is not limited to the constructions of the foregoing embodiments but can be also applied to any other constructions so long as they can accomplish the functions shown in the scope of Claims of the invention or the functions provided for the constructions of the embodiments.

According to the print system of the embodiment, even in the case where the edited print setting information is transferred from the information processing apparatus, the printing can be executed by efficiently using the print data stored in the specific storing medium in the printing apparatus.

According to another aspect of the embodiment, even if the document is updated, it is sufficient to execute the minimum operations such as creation and transfer of the data. The print data stored in the specific storing medium can be efficiently used.

For example, the document which is used in the embodiment is general document (original) data. Document data, image data, table data, graphic data, data in which they exist mixedly, or the like can be mentioned as original data. As a printing apparatus, besides the inherent printing apparatus, naturally, a facsimile apparatus having the printing function, or a multifunction printer (MFP) having a printing function, a copying function, a scanner function, and the like may be also used.

The object of the invention is also accomplished by a method whereby a storing medium in which program codes of software to realize the functions of the embodiments have been recorded is supplied to a system or an apparatus and a computer (or a CPU, an MPU, or the like) of the system or apparatus reads out the program codes stored in the storing medium and executes them. In this case, the program codes themselves read out of the storing medium realize the functions of the embodiments. The program codes and the storing medium in which the program codes have been stored construct the invention.

As a storing medium to supply the program codes, for example, a floppy (registered trademark) disk, a hard disk, a magnetooptic disk, a CD-ROM, a CD-R, a CD-RW, a DVD-ROM, a DVD-RAM, a DVD-RW, a DVD-RW, a magnetic tape, a non-volatile memory card, a ROM, or the like can be used. The program codes can be also downloaded through the network.

The invention incorporates not only the case where the computer executes the read-out program codes, so that the functions of the embodiments mentioned above are realized but also the case where an OS (operating system) or the like which is operating on the computer executes a part or all of actual processes on the basis of instructions of the program codes and the functions of the embodiments mentioned above are realized by those processes.

Further, the invention incorporates the case where the program codes read out of the storing medium are written into a memory provided for a function expanding board inserted in a computer or a function expanding unit connected to the computer, thereafter, a CPU or the like provided for the function expanding board or the function expanding unit executes a part or all of actual processes on the basis of instructions of the program codes, and the functions of the embodiments mentioned above are realized by those processes.

Naturally, the invention incorporates not only the case where the computer executes the read-out program codes, so that the functions of the embodiments mentioned above are realized but also the case where the OS or the like which is operating on the computer executes a part or all of actual processes on the basis of instructions of the program codes and the functions of the embodiments mentioned above are realized by those processes.

In such a case, the program is directly supplied from the storing medium in which such a program has been stored or is supplied by downloading from another computer (not shown) connected to the Internet, commercially available network, local area network, or the like, a database, or the like.

Although the embodiments have been described with respect to the case where the printing system of the printer is an electrophotographic system as an example, the invention is not limited to such an electrophotographic system but can be also applied to other various printing systems such as ink-jet system, thermal transfer system, heat sensitive system, electrostatic system, discharge breakdown system, and the like.

The form of the program may be a form of object codes, program codes which are executed by an interpreter, script data which is supplied to the OS (Operating System), or the like.

This application claims priority from Japanese Patent Application No. 2005-103822 filed on Mar. 31, 2005, which is hereby incorporated by reference herein.

What is claimed is:

1. An information processing apparatus which communicates with a printing apparatus which stores print data and print setting information, comprising:
   an obtaining unit adapted to obtain the print setting information from the printing apparatus;
   a discrimination unit adapted to, if the print setting information obtained by said obtaining unit is edited, discriminate whether or not it is necessary to recreate the print data for the printing based on the edited print setting information;
   a transmission unit adapted to, if it is determined by said discrimination unit that it is unnecessary to recreate the print data, transmit the edited print setting information to said printing apparatus in order to allow the printing apparatus to print the print data stored in said printing apparatus;
   an updating decision unit adapted to discriminate whether or not document data corresponding to the print data has been updated; and
   an exchange data forming unit adapted to, if the document data corresponding to the print data has been updated, form exchange data of an amount corresponding to an updated page, and
   wherein said transmission unit transmits the exchange data to said printing apparatus.

2. An apparatus according to claim 1, further comprising a data creation decision unit adapted to, if the document data has been updated, discriminate whether or not it is necessary to recreate the print data of all pages, and
   wherein if it is decided that it is unnecessary to recreate the print data of all of the pages, the exchange data of the amount corresponding to the updated page is formed by said exchange data forming unit, and if it is decided that it is necessary to recreate the print data of all of the pages, the print data of all of the pages is recreated by said exchange data forming unit.

3. An apparatus according to claim 1, further comprising an edition decision unit adapted to discriminate whether or not the print setting information has been edited, and
   wherein if the print setting information is not edited and the document data has been updated, the exchange data of the amount corresponding to the updated page is formed by said exchange data forming unit.

4. An information processing method in an information processing apparatus which communicates with a printing apparatus which stores print data and print setting information, comprising:
   an obtaining step of obtaining the print setting information from the printing apparatus;
   a discriminating step of, if the print setting information obtained in said obtaining step is edited, discriminating whether or not it is necessary to recreate the print data for the printing based on the edited print setting information;
   a transmitting step of, if it is determined in said discriminating step that it is unnecessary to recreate the print data, transmitting the edited print setting information to the printing apparatus in order to allow the printing apparatus to print the print data stored in the printing apparatus;
   an updating deciding step of discriminating whether or not document data corresponding to the print data has been updated; and
   an exchange data forming step of, if the document data corresponding to the print data has been updated, forming exchange data of an amount corresponding to an updated page, and
   wherein in said transmitting step, the exchange data is transmitted to the printing apparatus.

5. A method according to claim 4, further comprising a data creation deciding step of, if the document data has been updated, discriminating whether or not it is necessary to recreate the print data of all pages, and
   wherein if it is decided that it is unnecessary to recreate the print data of all of the pages, the exchange data of the amount corresponding to the updated page is formed in said exchange data forming step, and if it is decided that it is necessary to recreate the print data of all of the pages, the print data of all of the pages is recreated in said exchange data forming step.

6. A method according to claim 4, further comprising an edition deciding step of discriminating whether or not the print setting information has been edited, and
   wherein if the print setting information is not edited and the document data has been updated, the exchange data of the amount corresponding to the updated page is formed in said exchange data forming step.

7. A computer-readable storage medium that stores a control program to execute an information processing method in an information processing apparatus which communicates with a printing apparatus which stores print data and print setting information, wherein the control program allows a computer to execute:
   an obtaining step of obtaining the print setting information from the printing apparatus;
   a discriminating step of, if the print setting information obtained in said obtaining step is edited, discriminating whether or not it is necessary to recreate the print data for the printing based on the edited print setting information;
   a transmitting step of, if it is determined in said discriminating step that it is unnecessary to recreate the print data, transmitting the edited print setting information to the printing apparatus in order to allow the printing apparatus to print the print data stored in the printing apparatus;
   an updating deciding step of discriminating whether or not document data corresponding to the print data has been updated; and
   an exchange data forming step of, if the document data corresponding to the print data has been updated, forming exchange data of an amount corresponding to an updated page, and
   wherein in said transmitting step, the exchange data is transmitted to the printing apparatus.

* * * * *